(No Model.) 2 Sheets—Sheet 1.
E. RILEY.
PROCESS OF MOLDING SHEAVES.
No. 409,117. Patented Aug. 13, 1889.
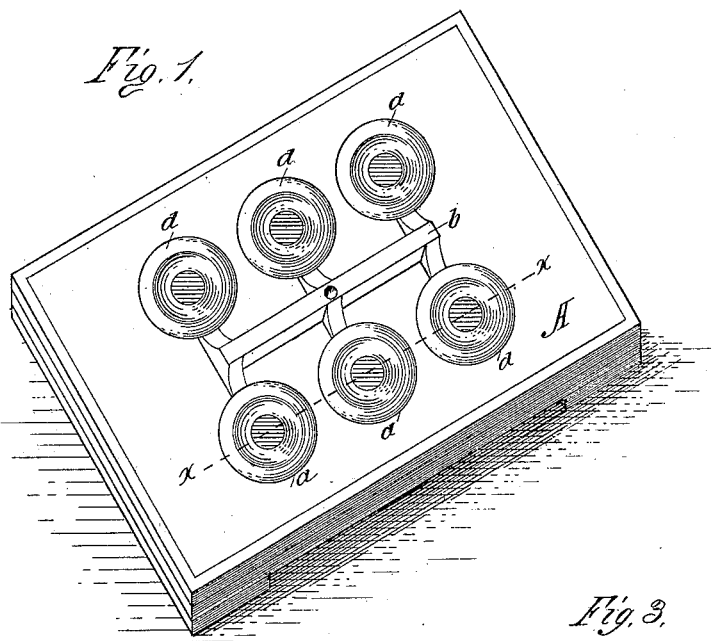
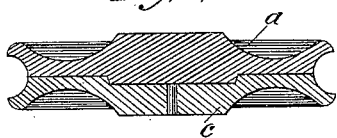
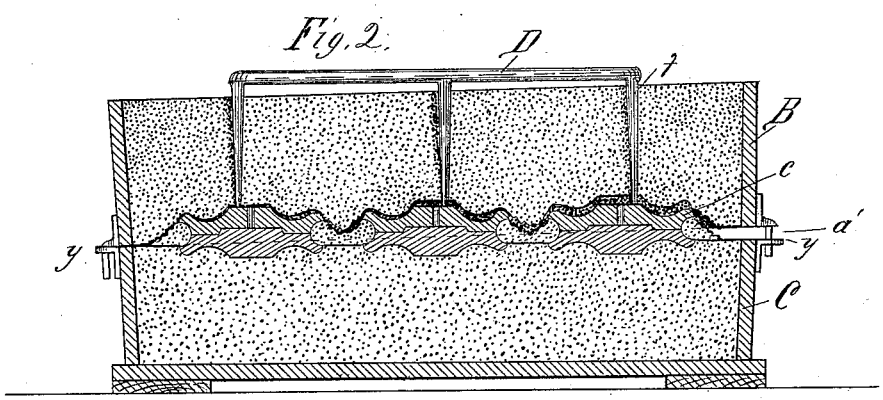
Witnesses:
J. A. Graham
B. Knorr
Inventor,
Edward Riley
By J. H. Latimer
Attorney (No Model.) 2 Sheets—Sheet 2.
E. RILEY.
PROCESS OF MOLDING SHEAVES.
No. 409,117. Patented Aug. 13, 1889.
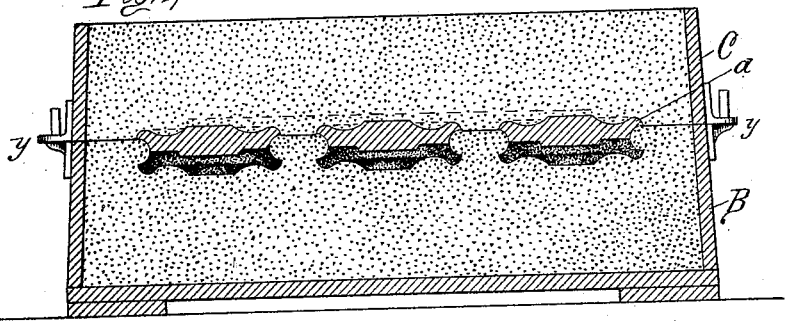
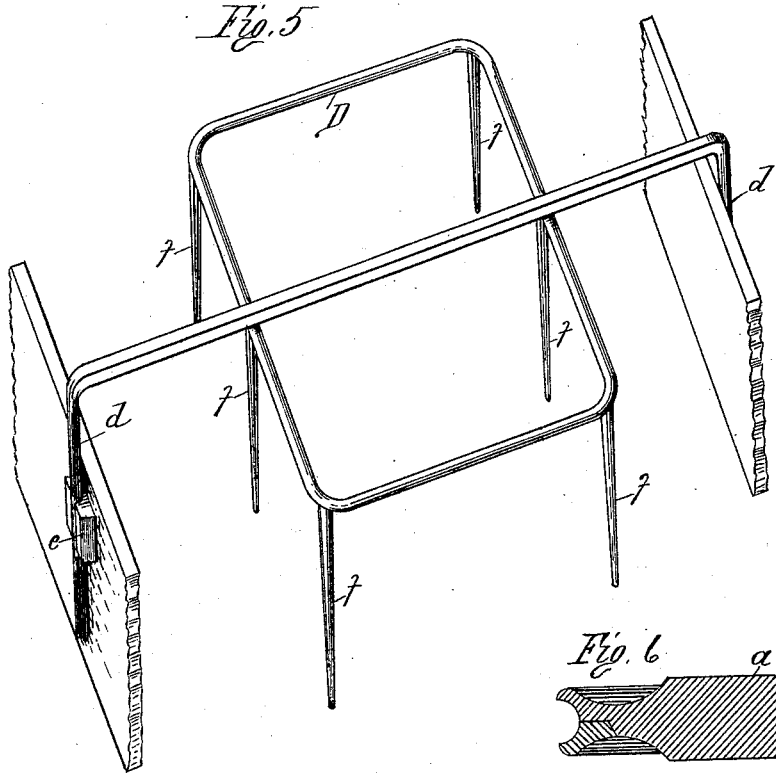
Witnesses:
J. A. Graham
B. Knurr
Inventor,
Edward Riley
By J. W. Latimer
Attorney.

UNITED STATES PATENT OFFICE.

EDWARD RILEY, OF MILWAUKEE, WISCONSIN, ASSIGNOR OF ONE-HALF TO THE MILWAUKEE HARVESTER COMPANY, OF SAME PLACE.

PROCESS OF MOLDING SHEAVES.

SPECIFICATION forming part of Letters Patent No. 409,117, dated August 13, 1889.

Application filed May 11, 1889. Serial No. 310,671. (No model.)

*To all whom it may concern:*

Be it known that I, EDWARD RILEY, a citizen of the United States, residing at Milwaukee, in the county of Milwaukee and State of Wisconsin, have invented certain new and useful Improvements in the Molding of Sheaves; and I do hereby declare that the following is a full, clear, and exact description of my invention.

My invention relates to an improvement in the art of molding sheaves when two or more patterns are gated together.

In the usual method of making molds for sheaves a supplemental parting for the purpose of removing the pattern from the mold was made by hand, which necessarily makes the process slow and expensive.

The object of my invention is to simplify the process, so that a gate of split sheave-patterns may be molded as readily as any simple or plain pattern, and thus greatly increase the number of molds put up in a day by a single molder.

In the drawings which form a part of this specification, Figure 1 illustrates a follow-board of the usual form, with parts of the sheave-patterns gated together and placed in position ready for beginning the mold. Fig. 2 is a sectional elevation of the flask and mold inverted and illustrating the method of making the forced or supplemental parting. The plane cutting this section is represented by the line $x$ $x$, Fig. 1. Fig. 3 is a sectional view of a sheave, showing the usual method of parting the pattern. Fig. 6 illustrates still another parting; but my invention does not depend upon any particular parting or form of sheave-patterns, for when a parting of a pattern is made as shown in Fig. 6 the detainer secures the edge or rim of the pattern instead of the center. Fig. 4 is a section of the flask and mold in their proper position, the gated parts of the patterns alone remaining in the mold. Fig. 5 is a perspective view of the detainer D, attached to guide-bars $d$, which slide in ways $e$, fixed to the sides of the flask for the purpose of guiding the projections $f$ of the detainer to the proper places upon the pattern.

Similar letters refer to similar parts throughout the several views.

To make the mold I proceed as follows: The follow-board A, Fig. 1, with the gated parts of the patterns $a$, is placed in position. The cope C is placed upon the follow-board and rammed up. The cope is then turned over and the follow-board removed. This places the cope in an inverted position, as shown in Fig. 2. The loose or removable part of the patterns $c$ are put in their respective places, and the drag B is inverted and placed upon the cope C, as shown in Fig. 2. The drag B in turn is rammed up, and the prongs $f$ of the detainer D are pressed down through the mold, as shown in Fig. 2, until they rest upon parts $c$ of the patterns. The molder then, with one hand upon the detainer, holds the parts $c$ of the patterns down, while with the other he lifts the drag B slightly, as shown at $a'$, Fig. 2. The operation is then reversed, and the opposite side of the drag is lifted to insure a perfect parting. A forced supplemental parting is thus made about the sheave-patterns by breaking the mold between the regular parting of the flask, line $y$ $y$, Fig. 2, and the opposite outer extremity of the concavity of the sheaves. The detainer D is then removed, the drag B lifted, and the parts $c$ of the patterns withdrawn. The drag is then replaced and the mold turned over, as shown in Fig. 4. The cope C can now be lifted off, the remainder of the patterns withdrawn, and when the cope C is replaced the mold is ready for pouring.

Having thus fully described my invention, what I claim as new, and desire to secure by Letters Patent, is—

1. The improvement in the art of molding sheaves which consists in making a forced supplemental parting after the mold has been set up for the purpose of removing the patterns from the mold.

2. The improvement in the art of molding a gate of split sheave-patterns which consists in detaining the removable part of the patterns after the mold has been set up, while the cope and drag are separated sufficiently to cause the mold to part around the patterns, the external concavity of the sheaves retaining part of the mold, thus forming a forced supplemental parting for the purpose of removing the patterns.

In testimony that I claim the foregoing I have hereunto set my hand, at Milwaukee, in the county of Milwaukee and State of Wisconsin, in the presence of two witnesses.

EDWARD RILEY.

Witnesses:
HENRY SPINKS,
LINDLEY COLLINS.